(12) United States Patent
Clüsserath et al.

(10) Patent No.: US 10,358,332 B2
(45) Date of Patent: Jul. 23, 2019

(54) FILLING DEVICE

(71) Applicant: KHS GmbH, Dortmund (DE)

(72) Inventors: Ludwig Clüsserath, Bad Kreuznach (DE); Dieter-Rudolf Krulitsch, Bad Kreuznach (DE)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 16/060,468

(22) PCT Filed: Nov. 14, 2016

(86) PCT No.: PCT/EP2016/077551
§ 371 (c)(1),
(2) Date: Jun. 8, 2018

(87) PCT Pub. No.: WO2017/102195
PCT Pub. Date: Jun. 22, 2017

(65) Prior Publication Data
US 2018/0362316 A1    Dec. 20, 2018

(30) Foreign Application Priority Data

Dec. 16, 2015   (DE) .................. 10 2015 122 033

(51) Int. Cl.
| | |
|---|---|
| *B67C 3/20* | (2006.01) |
| *B67C 3/04* | (2006.01) |
| *B67C 3/28* | (2006.01) |
| *G01F 1/58* | (2006.01) |

(52) U.S. Cl.
CPC .................. *B67C 3/20* (2013.01); *B67C 3/04* (2013.01); *B67C 3/28* (2013.01); *B67C 3/286* (2013.01); *G01F 1/58* (2013.01)

(58) Field of Classification Search
CPC .... B67C 3/20; B67C 3/04; B67C 3/28; B67C 3/286; G01F 1/58
See application file for complete search history.

(56) References Cited

U.S. PATENT DOCUMENTS

| | | | | |
|---|---|---|---|---|
| 3,172,436 | A | * | 3/1965 | Wilhere .................... B67C 3/04 141/140 |
| 3,322,138 | A | * | 5/1967 | Backman ................ F16K 1/123 137/219 |
| 3,626,988 | A | * | 12/1971 | Chu ....................... F16L 51/027 138/121 |
| 3,633,945 | A | * | 1/1972 | Press ..................... F16L 51/027 285/226 |

(Continued)

FOREIGN PATENT DOCUMENTS

| | | | | |
|---|---|---|---|---|
| DE | | 20009697 U1 | * 8/2000 | ............. F16K 1/446 |
| DE | 10 2006 014103 | | 4/2008 | |

(Continued)

*Primary Examiner* — Timothy L Maust
*Assistant Examiner* — James R Hakomaki
(74) *Attorney, Agent, or Firm* — Occhiuti & Rohlicek LLP

(57) ABSTRACT

A filling device for filling containers with liquid product includes a valve that is arranged in a product channel thereof. The valve comprises a valve element that is arranged in the product channel and a valve seat that surrounds the valve element to form the valve. The valve element and valve seat can be adjusted relative to each other. Length-adjustable connectors connect the valve seat to the product channel on both sides of the valve seat.

20 Claims, 6 Drawing Sheets

(56) References Cited

U.S. PATENT DOCUMENTS

| | | | | |
|---|---|---|---|---|
| 3,784,156 A * | 1/1974 | Paetzel | ............... | F16K 1/123 |
| | | | | 137/219 |
| 3,794,222 A * | 2/1974 | Loewenthal | ............ | G01F 11/08 |
| | | | | 222/207 |
| 3,802,322 A * | 4/1974 | Johnson | ............... | F16J 15/52 |
| | | | | 92/34 |
| 4,402,461 A * | 9/1983 | Mosse | ............... | B65B 39/02 |
| | | | | 222/381 |
| 4,648,421 A * | 3/1987 | Chant | ............... | B65B 39/004 |
| | | | | 137/312 |
| 4,722,231 A * | 2/1988 | Tanaka | ............... | G01F 1/58 |
| | | | | 73/861.12 |
| 4,817,688 A * | 4/1989 | Corniea | ............... | B65B 39/02 |
| | | | | 141/140 |
| 4,840,205 A * | 6/1989 | Drevfors | ............... | B65B 3/30 |
| | | | | 141/114 |
| 4,869,397 A * | 9/1989 | Corniea | ............... | B65B 39/02 |
| | | | | 222/63 |
| 4,903,740 A * | 2/1990 | Corniea | ............... | B65B 39/02 |
| | | | | 141/1 |
| 5,025,991 A * | 6/1991 | Stainbrook | ............... | B65B 3/22 |
| | | | | 239/459 |
| 6,183,223 B1 * | 2/2001 | Yajima | ............... | F04B 43/107 |
| | | | | 417/478 |
| 7,308,917 B2 * | 12/2007 | Krulitsch | ............... | B67C 3/26 |
| | | | | 141/198 |
| 8,286,937 B2 * | 10/2012 | Forster | ............... | F16K 1/12 |
| | | | | 137/219 |
| 9,150,398 B2 * | 10/2015 | Hartel | ............... | B67C 3/045 |
| 2005/0262804 A1 * | 12/2005 | Clusserath | ............... | B67C 3/20 |
| | | | | 53/281 |
| 2006/0150746 A1 * | 7/2006 | Keese | ............... | G01F 1/58 |
| | | | | 73/861.12 |
| 2006/0174716 A1 * | 8/2006 | Zajac | ............... | G01F 1/58 |
| | | | | 73/861.12 |
| 2010/0071803 A1 * | 3/2010 | Clusserath | ............... | B67C 3/04 |
| | | | | 141/65 |
| 2010/0108180 A1 * | 5/2010 | Clusserath | ............... | B67C 3/004 |
| | | | | 141/1 |
| 2010/0132834 A1 * | 6/2010 | Clusserath | ............... | B67C 3/004 |
| | | | | 141/115 |
| 2011/0000578 A1 * | 1/2011 | Krulitsch | ............... | B67C 3/02 |
| | | | | 141/1 |
| 2011/0039044 A1 * | 2/2011 | Clusserath | ............... | B67C 3/001 |
| | | | | 428/34.1 |
| 2011/0303322 A1 * | 12/2011 | Clusserath | ............... | B67C 3/04 |
| | | | | 141/8 |
| 2012/0186695 A1 * | 7/2012 | Clusserath | ............... | B67C 3/2608 |
| | | | | 141/115 |
| 2014/0044607 A1 * | 2/2014 | Geltinger | ............... | B29C 49/46 |
| | | | | 422/302 |
| 2015/0071802 A1 * | 3/2015 | Goldbrunner | ............... | G01F 11/022 |
| | | | | 417/490 |
| 2015/0191338 A1 * | 7/2015 | Krulitsch | ............... | B65B 39/001 |
| | | | | 141/129 |

FOREIGN PATENT DOCUMENTS

| | | | | |
|---|---|---|---|---|
| DE | 10 2013 106 927 | | 1/2015 | |
| EP | 0 090 664 | | 10/1983 | |
| GB | 1335007 A | * | 10/1973 | ............ G01F 11/08 |
| WO | WO2010/112143 | | 10/2010 | |

\* cited by examiner

FILLING DEVICE

RELATED APPLICATIONS

This application is the national stage entry under 35 USC 371 of international application PCT/EP2016/077551, filed on Nov. 14, 2016, which claims the benefit of the Dec. 16, 2015 priority date of German application DE102015122033.4, the contents of which are herein incorporated by reference.

FIELD OF INVENTION

The present invention relates to a filling device for filling liquids, in particular beverages.

BACKGROUND

A filling device is used to fill containers with liquid. A typical filling device includes a connection to a supply of the liquid and a valve that regulates how much liquid should enter the container.

SUMMARY

In one aspect, the invention features a filling device that has a product supply and a product channel. The product channel connects to the product supply and that opens into a dispensing opening.

Arranged in the product channel is a filling-and-regulating valve, arranged adjacent to which is a flow meter. Arranged in the region of the dispensing opening is a gas barrier that prevents gas, in particular air, from penetrating from below into the product channel.

The filling-and-regulating valve is formed from a valve element that is centered in the product channel and a valve seat surrounding the valve element. The axial setting of the valve element and the valve seat relative to one another, in particular in the direction of the product channel, can be controlled. Such control is used to fill a container located beneath the dispensing opening with whatever liquid is in the product channel.

In one aspect, the invention features a valve seat that can be adjusted in the axial direction of the product channel. Length-adjustable connection elements connect the valve seat to the product channel. These length-adjustable connection elements are arranged on both sides of the valve seat. As a result, the valve seat can be arranged independently of the position of the product supply, e.g. of a product supply space. This promotes more flexible design than that available in known filling devices. Because the valve seat connects to the product channel by connection elements on both sides, i.e. located beneath, the axial position of the valve seat can be selected at will. This allows considerable greater freedom in the design of the machine.

In some embodiments, a pair of folding bellows that forms part of the product channel's wall also forms the connection elements. Folding bellows move easily in unison as axial adjustment of the valve seat causes a change in length. Folding bellows also form a smooth inner surface of the product channel, thus inhibiting deposition of products. Folding bellows thus provide an effective way to provide an effective and hygienic valve seat arrangement in the product channel that is also axially adjustable.

Some embodiments feature folding bellows that are made of polytetrafluorethylene or at least coated with polytetrafluorethylene. This enhances hygiene and prevents product deposits on the inner all of the folding bellows element, which forms the inner wall of the product channel.

In other embodiments, an integrated flexible wall forms the folding bellows elements and the valve seat. As a result, there are no transition points formed between the two folding bellows elements and the valve seat. Such transition points, when present, are particularly vulnerable to product deposition. The integrated configuration of the two folding bellows elements with the valve seat forms a continuous inner surface on which the product with which the container is to be filled can adhere only with great difficulty. This embodiment therefore fulfills the most stringent hygiene requirements. In some of these embodiments, the flexible wall element has a ring-shaped valve seat section to which folding bellows sections connect on both sides.

For the opening and closing of the filling-and-regulating valve, either the axial setting of the valve element is controlled or the axial setting of the valve element is constant and the axial setting of the valve seat for the filling process is controlled. In some embodiments, both are moved. However, this causes undue complexity.

Axial adjustment of the valve element and the valve seat relative to one another provides a way to control the opening cross-section of the filling-and-regulating valve. This is useful to take account of the filling behavior of different beverages.

Because of the flow meter, it becomes possible to accurately detect how much liquid has entered a container and therefore possible to accurately control opening and closing of the valve.

In some embodiments, a gas barrier arranged in the dispensing opening suppresses entry of air into the product channel through the dispensing opening. Such errant air is particularly undesirable because it adversely impacts flow-meter measurements.

In some embodiments, the flowmeter is a magnetically inductive flowmeter. This particular type of flowmeter is particularly useful because it permits flow measurement without actual contact with the liquid. This promotes hygiene. Among these embodiments are those in which the magnetically inductive flow meter encircles the product channel.

In some embodiments, a valve cone forms the valve element. Such a valve element is able to open and close gently, thereby minimizing turbulence.

Some embodiments permit control over axial adjustment of the valve element in the product channel so as to regulate the quantity of liquid that passes into the container. Examples of such embodiments include those that rely on a valve rod. In some embodiments, the valve rod couples to a link-control arrangement of a filling machine that has filling devices arranged in a circle.

Some embodiments feature a spring that pre-tensions the valve seat against a stop. As a result, when closing of the regulating-and-filling valve, the valve seat gives way in the closure direction against the spring pressure. This results in a gentle closing of the valve. Gentle closure is particularly advantageous for avoiding turbulence and for avoiding undue stress on the valve's sealing surfaces.

The invention likewise relates to a filling machine that has filling devices as described herein. In some embodiments, the filling devices are arranged in a circle to form a circular filling machine.

Such a filling machine, in some cases, includes a link control arrangement for actuating at least one adjustment element of each filling device. Such an adjustment element is capable, for example, influencing the axial adjustment of the valve element and/or of the valve seat. By way of the adjustment element, for example, an actuating element can be actuated with a predetermined lift, which in turn actuates the valve seat in the axial direction.

The actuation element can likewise comprise an actuator drive that can be actuated in a controlled manner based on signals from a flowmeter. This permits individual regulation of each filling procedure. Accordingly, while by way of the adjustment element it is possible to achieve a constant lift of the regulating and filling valve, it is possible, by way of the actuating element, for an individual component to be regulated during each filling procedure.

Different embodiments of the invention can be combined with one another in any desired manner.

BRIEF DESCRIPTION OF THE DRAWINGS

The invention is now described, for example, on the basis of the schematic drawings. These show.

In all the figures, elements that are identical or of the same function are provided with the same reference numbers.

DETAILED DESCRIPTION

Figure 1:
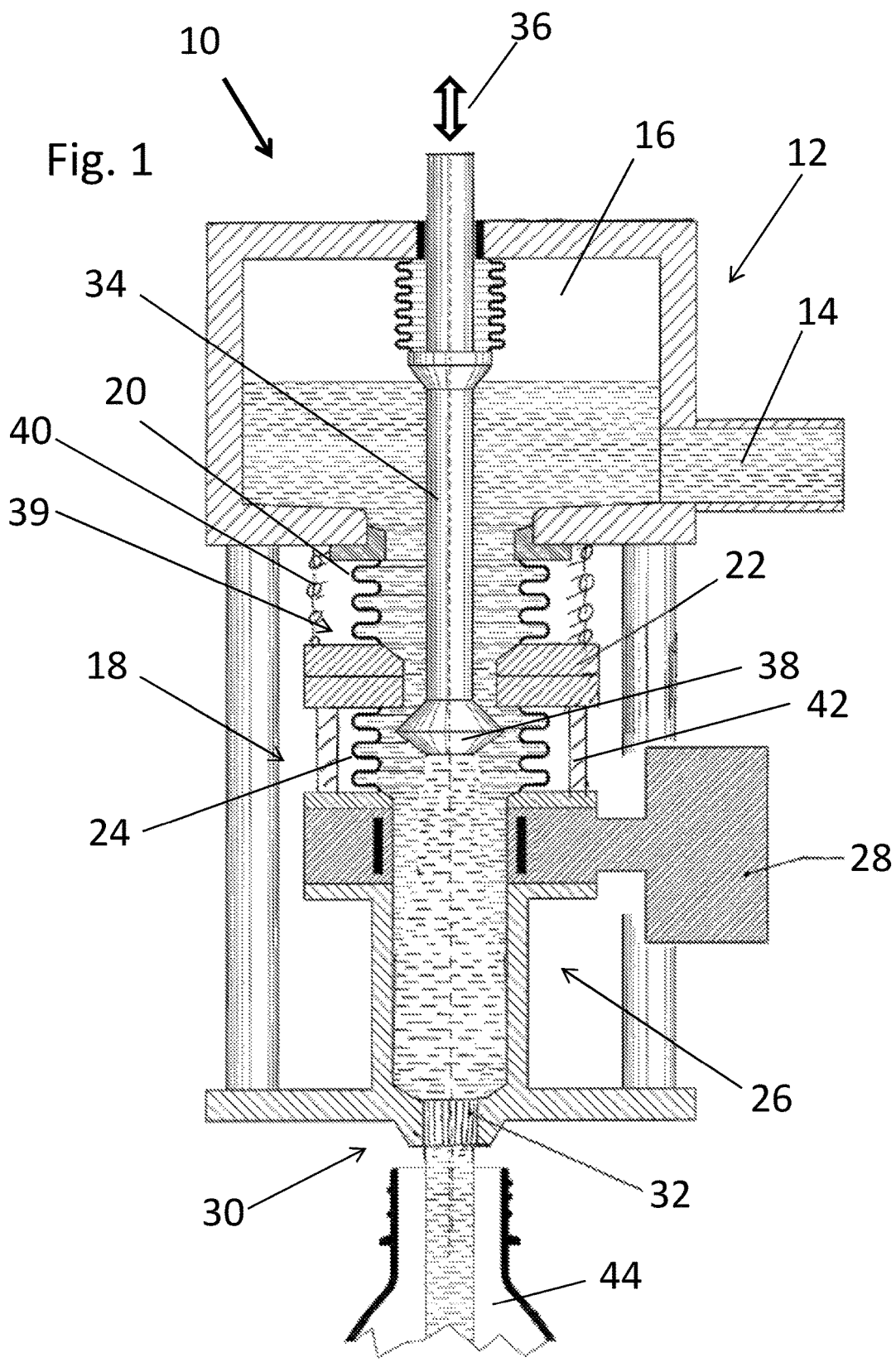
FIG. 1 shows a partially sectional view of a first embodiment of a filling device that has an axially-adjustable valve element.

FIG. 1 shows a first filling device 10 that includes a product-supply channel 14 that opens up into a cylindrical product space 16 to form a product supply 12. A first folding bellows element 20, a valve seat 22, a second folding bellows element 24, and a cylindrical lower product-channel section 26 define a product channel 18 that extends downward from the product space 16. A magnetically inductive flow meter (MID) 28 has been integrated into the lower product channel section 26.

The lower product-channel section 26 ends in a dispensing opening 30. A gas barrier 32 at the dispensing opening 30 prevents ambient air from entering the product channel 18 via the dispensing opening 30.

At the center of the product channel 18 is a valve rod 34. An actuator element 36, hereafter referred to as simply an "actuator 36," actuates the valve rod 34 so that it moves in the axial direction.

A valve element 38 held at the end of the valve rod 34 forms a counter-rotating double cone. In the illustrated embodiment, the valve element 38 is formed by two frustoconical structures joined at their bases. The valve element 38 interacts with the valve seat 22 to form a filling-and-regulating valve 39, hereafter referred to as "the valve 39."

A spring 40 holds the valve seat 22 under preliminary tension by means of a spring against an annular stop 42. In the illustrated embodiment, the stop 42 lies on the lower product channel section 26 and the spring 40 is a helical pressure spring.

The actuator 36 controls the flow aperture of the valve 39. It does so by controlling the axial extent of the deflection. Doing so controls the cross-sectional area of the valve's annular opening.

When the valve 39 closes, the valve element 38 moves upwards and eventually reaches the valve seat 22. In response, valve seat 22 deflects slightly against the force of the pressure spring 40. This promotes a gentle closing of the valve 39, which in turn saves wear on the interacting sealing surfaces at the valve seat 22 and at the valve element 38. This gentle closure also reduces turbulence in the product. This, in turn, reduces the precipitation rate.

Hydrostatic pressure of the product in the product space 16 causes the product to flow downwards through the product channel 18, through the dispensing opening 32, and into a container 44, e.g. a bottle. The flowmeter 28 measures how much product has flowed into the bottle and sends an appropriate signal to a controller. When this amount corresponds to a reference value, the controller causes the actuator to actuate the valve rod 34. The filling device thus provides a simple way to fill a container 44 with a particular volume.

Figure 2:
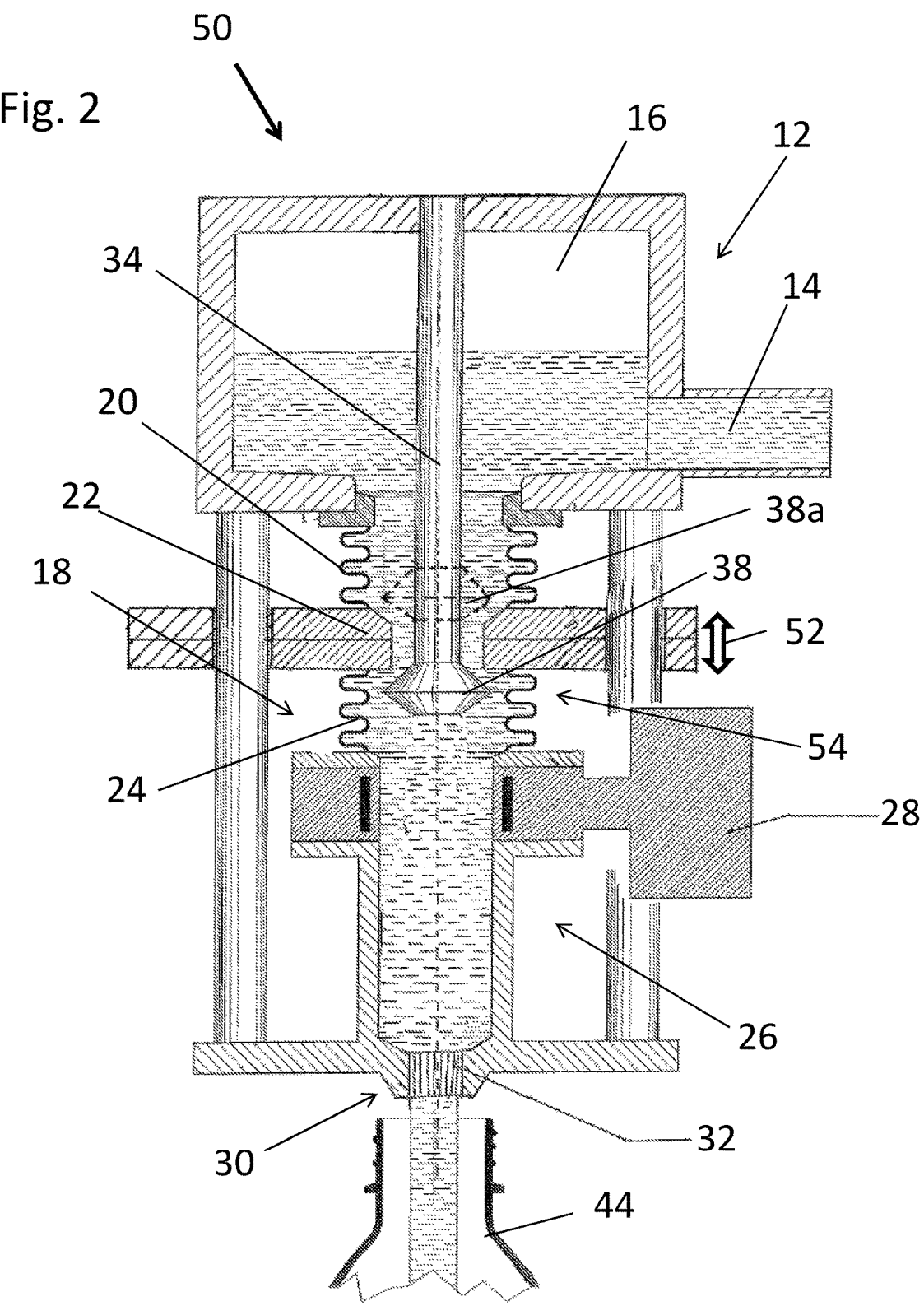
FIG. 2 shows a view similar to that shown in to FIG. 1 of a second embodiment of a filling device that has an axially-adjustable valve seat.

A second filling device 50, shown FIG. 2 differs from that shown in FIG. 1 because the valve rod 34 and the valve element 38 connect to the product supply 12. In this embodiment, a valve-seat adjuster 52 adjusts the axial position of the valve seat 22. Together, the valve element 38 and the valve seat 22 form a filling-and-regulating valve 54. In one embodiment, the valve element 38 is below the valve seat 22, as shown in FIG. 2. However, in another embodiment, an otherwise identical valve element 38a it above the valve seat 22, as shown by the dotted line in FIG. 2. These embodiments differ only in the direction in which the actuator 36 moves.

In some embodiments, a link element of a filling machine controls the valve seat adjuster 52 in FIG. 2. Such a filling machine includes plural filling devices of the type described herein.

In other embodiments, a magnetically-inductive flow meter 28 provides a signal to be used for actuating the valve seat adjuster 52. This permits regulating the filling quantity at each individual filling process to be at a predetermined reference value, or in the alternative, to regulate the filling quantity over a period of time so that it conforms to a predetermined reference value.

Figure 3:
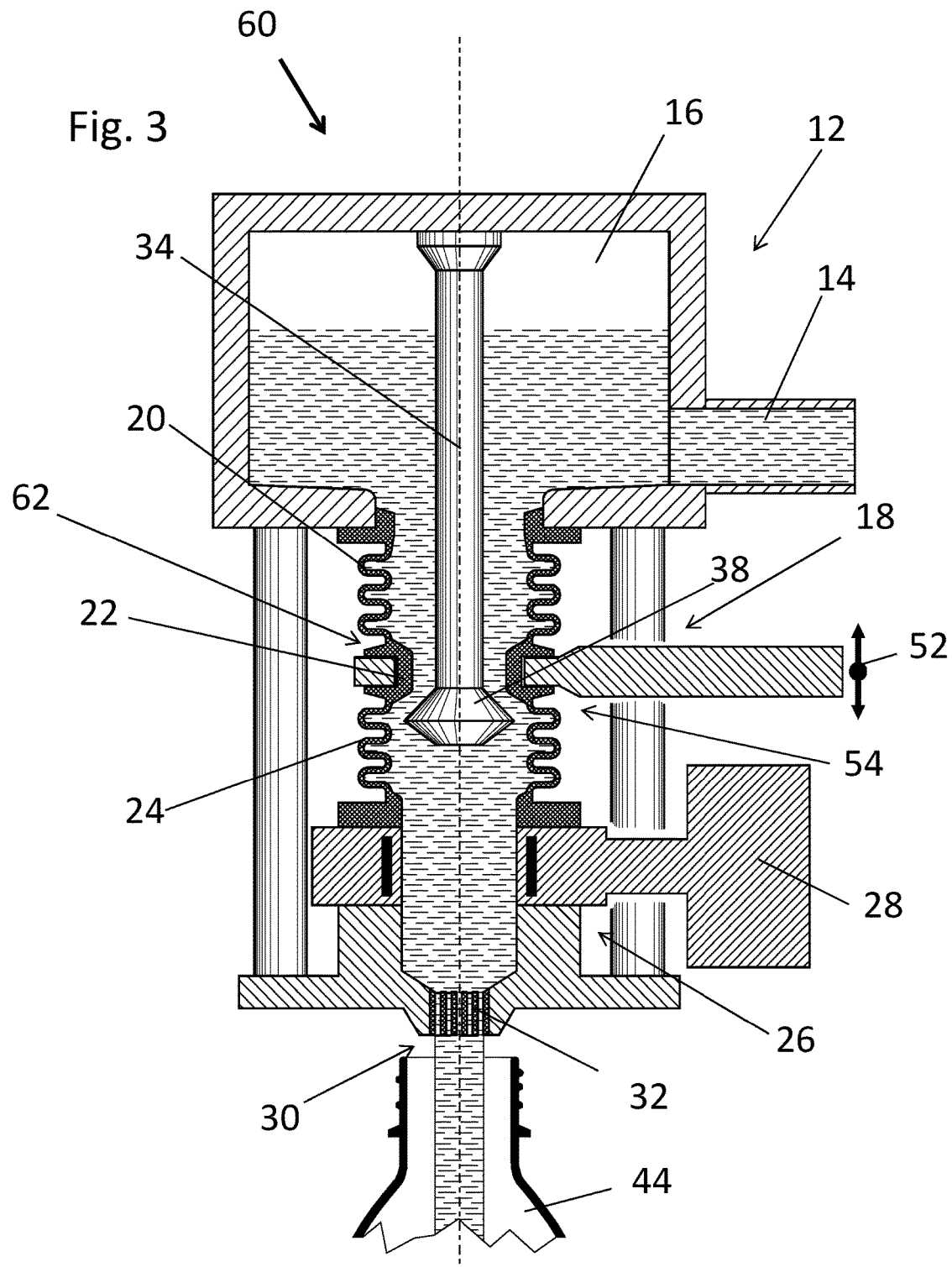
FIG. 3 shows a view similar to that shown in FIG. 1 of a third embodiment according to that shown in FIG. 2 with an integrated configured folding bellows element and a valve seat.

In a third filling device 60, shown in FIG. 3, an integrated wall element 62 forms the first folding bellows element 20, the valve seat 22, and the second folding bellows element 24. In this embodiment, the valve seat 22 is a polymer ring that is formed on an actuation arm that has a ring-shaped cut-out opening.

Figure 4:
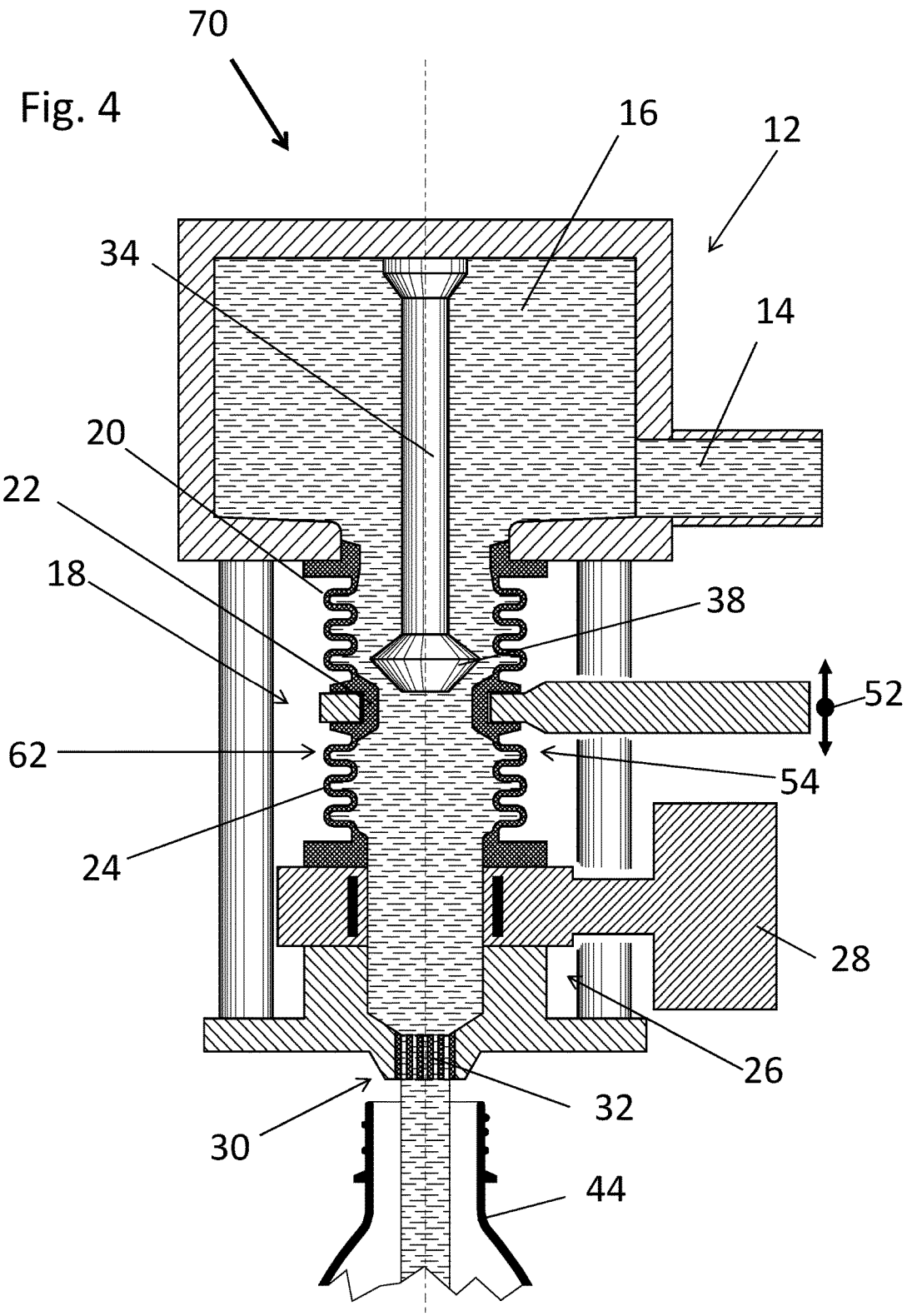
FIG. 4 shows a view similar to that shown in FIG. 1 of a fourth embodiment according to that shown in FIG. 3 that has a valve element that is positioned differently.

A fourth filling device 70, shown in FIG. 4, is largely identical to the third filling device 60 in FIG. 3 except that the valve element 38 is above rather than below the valve seat 22 in much the same way that the valve element 38a was above the valve seat 22 in FIG. 2.

Figure 5:
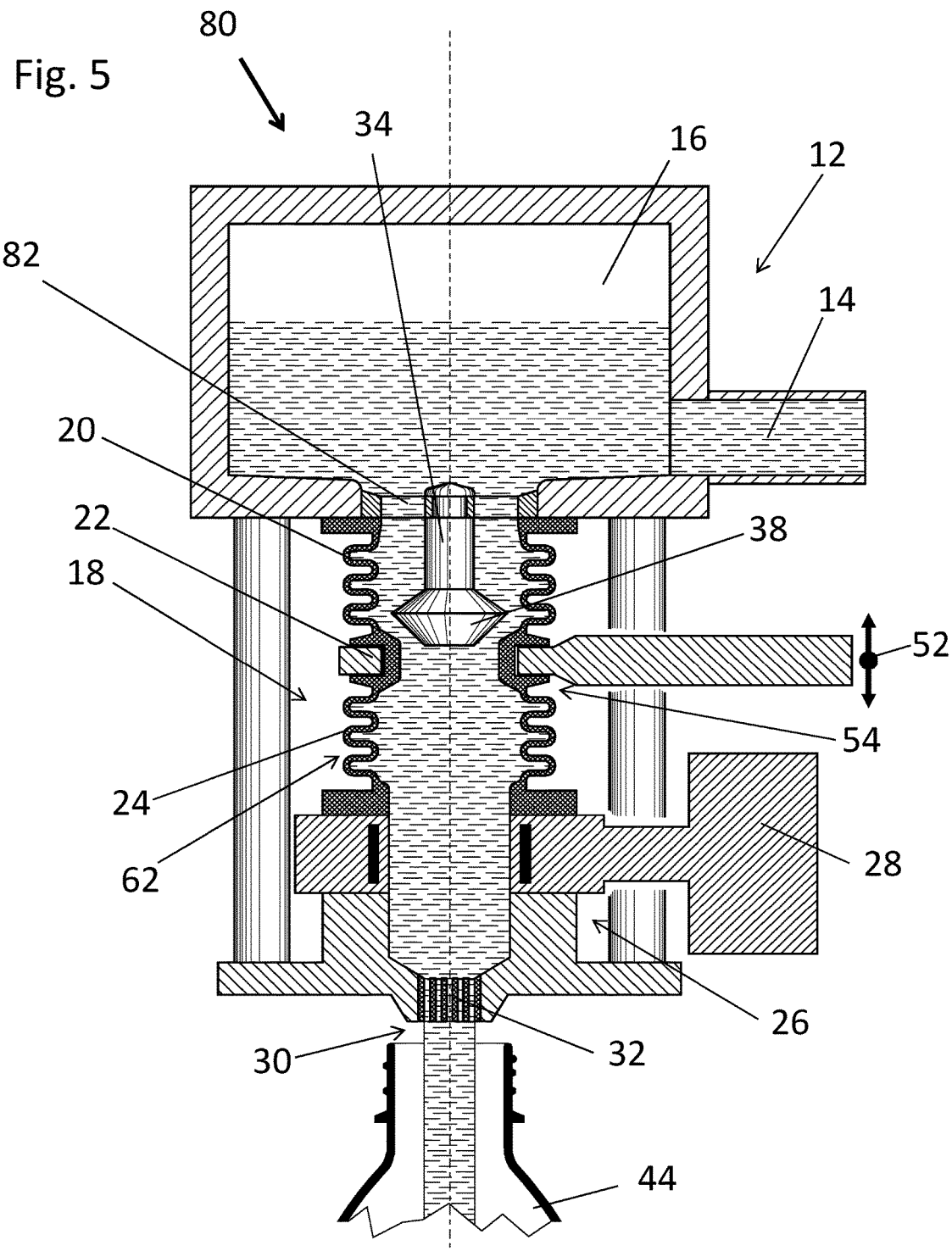
FIG. 5 shows a view similar to that shown in FIG. 1 of a fifth embodiment according to FIG. 3 with a valve element held in the mouth of the product channel in a position in accordance with that shown in FIG. 4.

FIG. 5 shows a fifth filling device 80 that differs from the fourth filling device 40 by no longer having the valve rod 34 and the valve element 38 secured to the upper side of the product space 16. Instead, a spoked-wheel holder 82 secures the valve rod 34 and the valve element 38 to an inlet of the product space 16 at the product channel 18. This results in a product space 16 that can more easily be kept hygienic.

Figure 6:
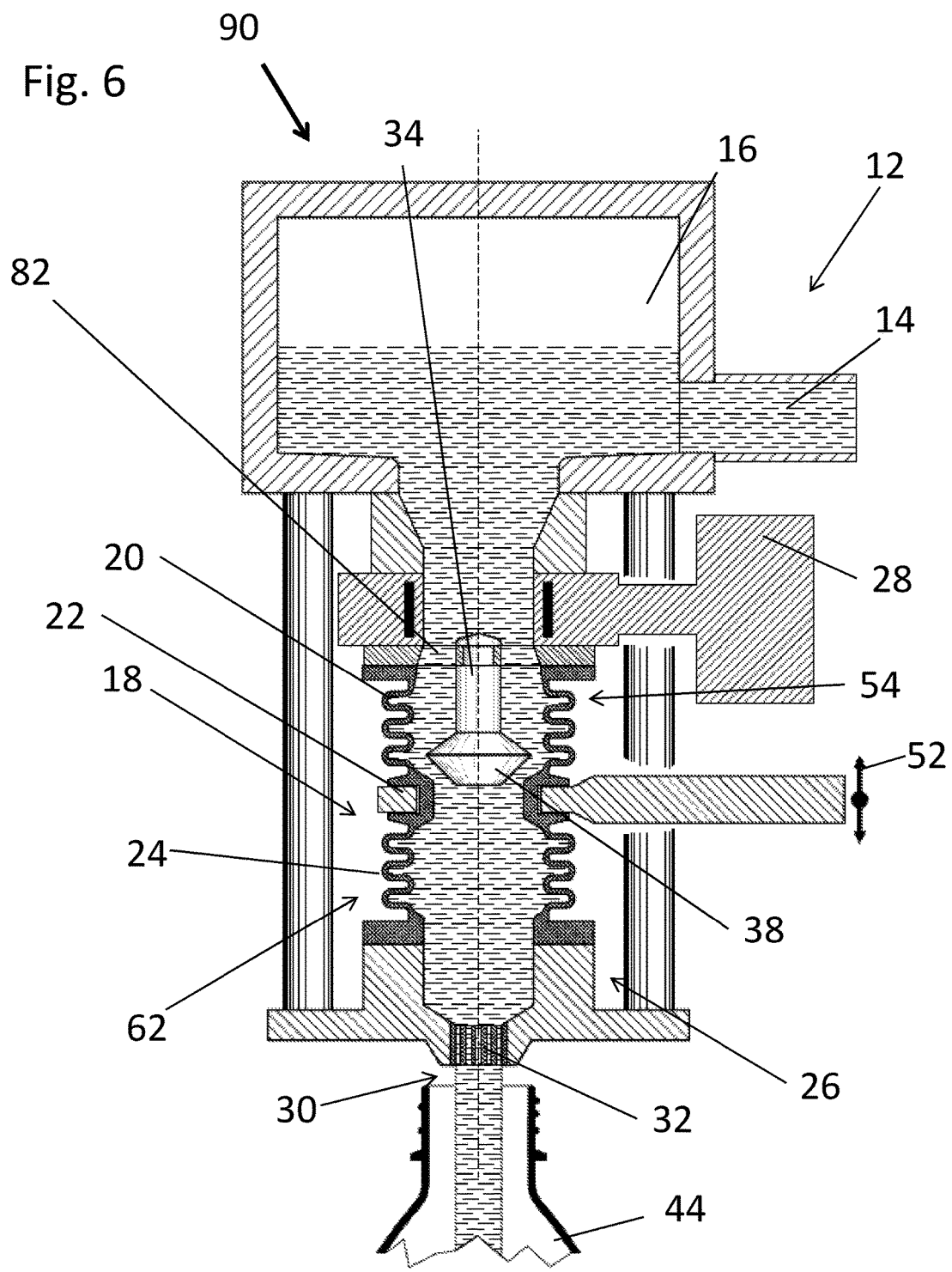
FIG. 6 shows a further embodiment, in which, for a filling device like that shown in FIG. 5, a different arrangement of the flow meter is provided.

Finally, FIG. 6 shows a sixth filling device 90 that differs from the fifth filling device 80 by having a flow meter 28 be arranged immediately beneath the product space 16 and above the valve element 38 rather than beneath this valve element 38, as was the case in the fifth filling device 80.

The invention is not restricted to the embodiments described herein. Other embodiments are within the scope of the appended claims.

The invention claimed is:

1. An apparatus comprising a filling device for filling containers with liquid product, wherein said filling device comprises a product supply and a product channel connected to said product supply, wherein said product channel opens into a dispensing opening, wherein said filling device further comprises a valve that is arranged in said product channel, wherein said valve is a filling-and-regulating valve, wherein said filling device further comprises a flowmeter that is arranged either upstream or downstream of said valve, wherein said filling device further comprises a gas barrier that is arranged in a region of said dispensing opening, wherein said valve comprises a valve element that is arranged in said product channel and a valve seat that surrounds said valve element to form said valve, wherein an adjustment setting of said valve element and said valve seat relative to each other is controllable, wherein said valve seat is adjustable along an axial direction of said product channel, wherein said filling device further comprises connectors that connect said valve seat to said product channel, wherein said connectors are length-adjustable, and wherein said connectors are arranged on both sides of said valve seat.

2. The apparatus of claim 1, further comprising a valve rod that prevents movement of said valve element.

3. The apparatus of claim 1, wherein a pair of polytetrafluoroethylene folding bellows forms said connectors, wherein said pair of folding bellows forms part of a wall of said product channel, said product channel being interrupted by at most said valve.

4. The apparatus of claim 1, further comprising a wall element that forms a pair of folding bellows, wherein said pair forms said connectors, wherein said pair of folding bellows forms part of a wall of said product channel, and wherein said wall element is an integrated flexible wall element.

5. The apparatus of claim 1, wherein an annular opening of said valve has a controllable cross-sectional area.

6. The apparatus of claim 1, wherein said valve element is below said valve seat.

7. The apparatus of claim 1, wherein said flowmeter surrounds said product channel.

8. The apparatus of claim 1, further comprising a valve rod, wherein said valve rod holds said valve element in said product channel.

9. The apparatus of claim 8, wherein said product channel opens up into a product space to form said product supply, wherein said valve rod is secured in said product space.

10. The apparatus of claim 1, wherein said valve element comprises two frustoconical structures joined at bases thereof.

11. The apparatus of claim 1, further comprising a valve-seat adjuster configured to cause controlled movement of said valve seat relative to said valve.

12. The apparatus of claim 11, wherein said filling device further comprises a spring and an annular stop, wherein said spring pre-tensions said valve seat against said annular stop.

13. The apparatus of claim 1, further comprising a product-supply channel that opens up into said product space.

14. The apparatus of claim 13, wherein said filling device further comprises an actuator that causes said valve to open and close.

15. The apparatus of claim 14, wherein said flowmeter is used when controlling an extent to which a stationary one of said valve seat and valve element deflects when said valve closes.

16. The apparatus of claim 1, wherein, during opening and closing of said valve, said valve element remains stationary and said valve seat moves towards or away from said valve element and wherein said valve seat deflects in response to closing of said valve.

17. The apparatus of claim 1, wherein said product supply is formed by a product space that contains said liquid product and wherein hydrostatic pressure of said liquid product in said product space causes said liquid product to flow through said product channel.

18. The apparatus of claim 1, wherein said valve element comprises a double cone.

19. The apparatus of claim 1, wherein said valve seat is configured to deflect in response to said valve element having reached said valve seat.

20. The apparatus of claim 1, wherein said flowmeter is arranged downstream of said valve.

* * * * *